March 16, 1937. C. W. MAPES ET AL 2,074,092
MOTOR MOUNTING
Filed Aug. 8, 1934
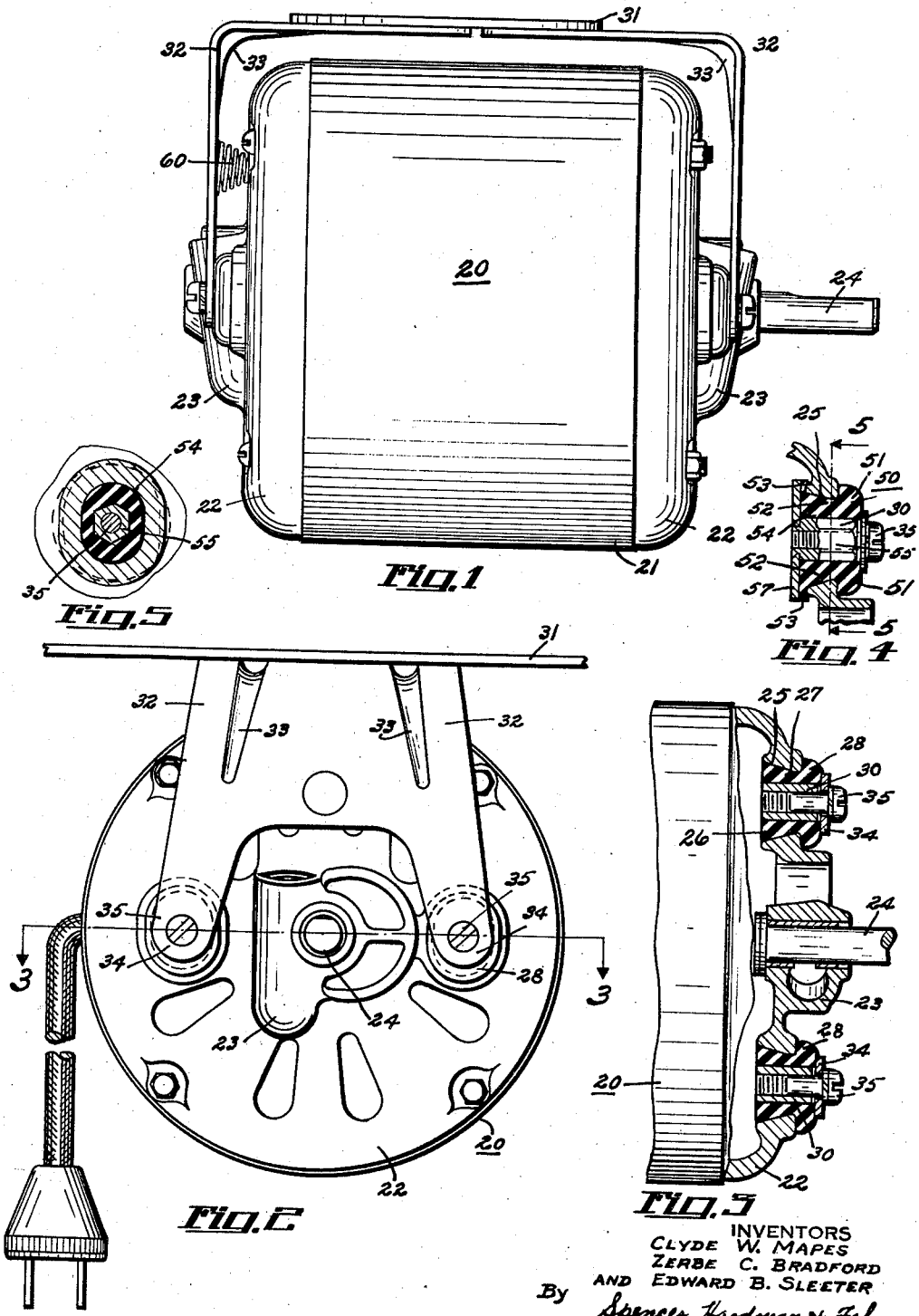
INVENTORS
CLYDE W. MAPES
ZERBE C. BRADFORD
AND EDWARD B. SLEETER
By Spencer, Hardman & Fehr
their ATTORNEYS Patented Mar. 16, 1937

2,074,092

UNITED STATES PATENT OFFICE 2,074,092

MOTOR MOUNTING

Clyde W. Mapes and Zerbe C. Bradford, Dayton, and Edward B. Sleeter, Warren, Ohio, assignors to General Motors Corporation, Detroit, Mich., a corporation of Delaware Application August 8, 1934, Serial No. 738,896

5 Claims. (Cl. 248—26)

This invention relates to resilient motor mounts, and more particularly to motor mounts for small motors for operating a domestic mechanical apparatus.

An object of the present invention is to provide an improved motor mount for a motor or other machines whereby the vibrations produced by the motor during its operation will not be transmitted to the main support and then amplified by the member to which the main support is attached.

More specifically it is an object of the present invention to actually secure resilient material directly to the motor to be supported so that the motor is yieldingly mounted with respect to a main support in order that motor vibrations and noises produced will not be transmitted to the main support.

Further objects and advantages of the present invention will be apparent from the following description, reference being had to the accompanying drawing wherein a preferred embodiment of the present invention is clearly shown.

In the drawing:

Fig. 1 is a side elevational view of the motor and support.

Fig. 2 is an end elevational view of the motor and support.

Fig. 3 is a sectional view taken on the line 3—3 of Fig. 2.

Fig. 4 is a sectional view of a modified form of the present invention.

Fig. 5 is a sectional view taken on the line 5—5 of Fig. 4.

Referring to the drawing, an electric motor 20 of small or fractional horsepower and of any suitable type comprises a frame 21 and bell end members 22. Each end member is provided with a projection 23 forming the usual oil reservoir or retainer for the proper lubrication of the bearing for a shaft 24 upon which is attached a pulley or wheel (not shown). The pulley provides the means by which the motor may be connected to any suitable device. Each end member is also provided with a pair of tapered openings 25, preferably of elongated form and so arranged that the greatest dimension of the opening is substantially in the direction of torque reaction of the motor. The openings are also arranged that the motor will be supported at each end at points which are remote from the motor axis.

Each opening 25 is adapted to receive a tubular bushing 26 or grommet of resilient material, such as rubber or its equivalent, having a tapered portion 27 and a flange 28, the tapered portion of the bushing substantially corresponds with the taper of the opening in the bell end member.

A metallic tubular insert or sleeve 30 is forced into or vulcanized to the resilient bushing, so as to prevent oil, grease or dirt from entering between the external surface of the insert and the bushing, thus eliminating the possibility of the rubber deteriorating and causing a loose connection. The diameter of the bushing is of such dimension with respect to the normal dimension of the opening in the housing that the resilient material will be compressed between the outer surface of the insert and the inner surface of the tapered opening after the bushing 26 is forced into the opening 25 and the flange 28 overlies a portion of the external surface of the end member 22. Thus each bushing 26 is firmly held in its opening. The opening 25 and the bushing 26 are preferably elongated, and are so arranged that the greatest dimension is substantially in the direction of torque reaction of the motor, in order to give the greatest flexibility in this direction (see Fig. 2). This construction also prevents the rubber bushing from turning relative to the end member.

The main support for the motor comprises a base member 31 to which is secured a pair of L-shaped standards 32 in any suitable manner, such as spot welding, riveting or the like. The standards are provided with ridges 33, as indicated, to give rigidity. The free end of the standards are provided with a pair of extensions 34, each extension having an aperture through which a bolt or screw 35 protrudes. Each bolt has a screw-threaded engagement with one of the inserts 30 secured in the end members 22; thus the motor 20 is supported by the standards through the inserts 30. Since the inserts are supported within the bushings, any vibration of the motor produced during operation will not be transmitted to the main support 31 and through it to a cabinet drum or any other apparatus to which the main support is attached. Thus it will be seen that the motor is resiliently mounted which will permit the motor as a whole to vibrate slightly in any direction while running without transmitting those vibrations to any portion of the support and then to the cabinet structure. This arrangement of the resilient bushings with respect to the motor will confine the vibrations to the motor itself with the result that the vibrations of the motor will not produce any audible sounds as the motor does not have direct contact or engagement with any rigid part on which the motor is mounted.

In Figs. 4 and 5 of the drawing, there is shown a second embodiment of the invention. In this modification a resilient bushing or grommet 50 is shown to include a flange 51, an intermediate tapered portion 52, and a second flange 53. The external dimension of tapered portion 52 is slightly larger in dimension than the opening 25 but corresponds to the taper of the opening. The bushing 50 is provided with an opening 54, preferably of non-circular formation. The opening is adapted to receive snugly an insert 55 having an external surface corresponding with the shape of the opening 54. The insert 55 carries a metallic washer 57 adapted to engage the outer surface of the flange 53. When the insert 55 and the resilient bushing 50 are assembled together, the assembly is forced through the opening 25 so that flange 51 overlies a portion of the external surface of the end member 25 and the flange 53 engages a portion of the internal surface of the end member. Since the dimension of the intermediate taper portion 52 is slightly larger than the dimension of the tapered opening 25, the resilient material between the outer surface of the insert 55 and the walls of the opening will be compressed; thus, with the aid of the flanges 51 and 53 the bushing 50 is firmly held within the opening.

The insert 55 is tapped for receiving the screw 35 used to connect the motor to the support. When the screw is tightened to secure the motor to the support the flanges 51 and 53 are compressed, flange 51 between the support and end member and flange 53 between the end member and washer. This compression of the flanges 51, 53 tends to urge the resilient material tightly against all metal parts thereby providing a seal to keep oil or grease away from the surfaces of the bushings that grip surfaces of the various metal parts. It is well known that oil and grease will cause rubber to deteriorate, thus the construction shown in Figs. 4 and 5 will tend to prolong the life of the bushing. Since the motor is insulatingly supported by the resilient bushings a spring 60 is provided, as shown in Fig. 1 to provide a ground connection for the motor.

We claim:

1. A motor mounting comprising in combination; a support; a housing having a tapered elongated opening; an elongated tubular member of resilient material secured within the opening, said member provided with a tapered portion and an inner and an outer flange overlying portions of the housing; a metal insert having a tapped shank and provided with a backing member, said backing member lying adjacent the inner flange of the tubular member, and said shank being of such diameter to compress the tapered portion of resilient material against the walls of the tapered opening to hold the tubular member within the opening; a screw passing through the support and threadedly received by the insert for securing the insert to the support, the tightening of the screw causing the inner flange to be compressed between the backing member and the housing and the outer flange to be compressed between the support and the housing to assist in maintaining the tubular member within the opening.

2. In a device of the character described, the combination comprising; a supporting member; a housing member having a tapered non-circular opening; a non-circular bushing of resilient material disposed within the opening, said bushing having a conical portion complementary to the taper of the opening, the outer periphery of the conical portion in its free state is enough larger than the inside dimensions of the opening that the bushing is stressed inwardly from its free state when the bushing is inserted in the opening and said bushing being provided with an inner and an outer flange which are adapted to overlie portions of the housing member; a metal insert having a shank and a backing member, said backing member adapted to engage the inner flange and the shank member adapted to extend through the bushing and is of such diameter to compress the resilient material between it and the walls of the opening; and means having screw-thread engagement with the shank of the insert to connect the supporting member with the housing member, the movement of the screw-threading means in one direction causing the inner flange of the bushing to be compressed between the backing member and the housing and the outer flange to be compressed between the support and the housing, whereby the bushing will insulate the housing member from the support and absorb vibrational movements of the housing in any direction.

3. In a device of the character described, the combination of a support, a housing member having a non-circular tapered opening, a metallic sleeve having internal threads, a body of resilient material vulcanized to the sleeve to form an assembly adapted to be forced into the opening of the housing member, said body having a non-circular portion of larger dimension than the opening so that when the assembly is forced into the opening the resilient material between the sleeve and the walls of the opening will be compressed, said body also having a portion overlying the housing and interposed between the housing member and the support; and means having screw-threaded engagement with the sleeve for connecting the sleeve to the support.

4. The combination of a member having a non-circular tapered opening, a tubular resilient cushioning device having two cushioning heads and an intermediate reduced tapered portion of greater dimension than the opening, a threaded insert supported in a non-rotatable relation within the cushioning device to provide an assembly, said assembly adapted to be forced through the opening and expand in the opening, and means having screw-thread engagement with the insert to connect the member to a support, whereby the cushioning device will insulate the member from the support and absorb vibrational movements of the member in any direction.

5. The combination of a member having a non-circular tapered opening, a threaded insert, a body of resilient material vulcanized to the insert, said body having a head and a tapered portion slightly larger in dimension than the opening in the member adapted to be forced into the opening, the tapered portion expanding in the opening and the head engaging the outer surface of the member, and means having screw-thread engagement with the insert to connect the member to a support, the movement of the screw-threading means in one direction causing the head of the body to be compressed between the support and the member, whereby the body will insulate the member from the support and absorb vibrational movements of the member in all directions.

CLYDE W. MAPES.
ZERBE C. BRADFORD.
EDWARD B. SLEETER.